United States Patent

Sanchez et al.

Patent Number: 6,118,546
Date of Patent: Sep. 12, 2000

[54] PRINTER/FACSIMILE DRIVER WITH PAGE COUNT GENERATION

[75] Inventors: George A. Sanchez, Fremont; Rakesh Mahajan, Laguna Hills; Loren A. Wood, Lakewood, all of Calif.

[73] Assignee: Canon Kabushiki Kaisha, Tokyo, Japan

[21] Appl. No.: 09/025,434

[22] Filed: Feb. 18, 1998

Related U.S. Application Data

[62] Division of application No. 08/453,282, May 30, 1995.
[51] Int. Cl.[7] .................. H04N 1/32; H04N 1/00
[52] U.S. Cl. .................. 358/1.6; 358/442; 358/400
[58] Field of Search .................. 358/442, 468, 358/444, 435, 436, 434, 1.6, 400

[56] References Cited

U.S. PATENT DOCUMENTS

| | | | |
|---|---|---|---|
| 5,267,047 | 11/1993 | Argenta et al. | 358/400 |
| 5,321,802 | 6/1994 | Furuya et al. | 358/400 |
| 5,339,167 | 8/1994 | Meguro et al. | 358/403 |
| 5,339,169 | 8/1994 | Meguro et al. | 358/403 |
| 5,414,528 | 5/1995 | Hatamura | 358/440 |
| 5,726,768 | 3/1998 | Ishikawa et al. | 358/442 |

FOREIGN PATENT DOCUMENTS

| | | |
|---|---|---|
| 05252322 | 9/1993 | Japan . |
| 05252324 | 9/1993 | Japan . |
| 0654090 | 2/1994 | Japan . |
| 06303370 | 10/1994 | Japan . |

*Primary Examiner*—Kimberly A. Williams
*Attorney, Agent, or Firm*—Fitzpatrick, Cella, Harper & Scinto

[57] ABSTRACT

A printer/facsimile system includes a printer/facsimile driver to automatically insert a facsimile cover sheet at the beginning of a facsimile document. The system includes the process steps of preparing a document to be faxed, invoking a facsimile dynamic link library which operates to create, by using facsimile dynamic link libraries, facsimile cover sheet data, and to call a printer driver to render a body of the facsimile document, rendering the facsimile document, spooling the rendered facsimile document from the printer driver to a memory and returning the number of rendered document pages to the facsimile application, recalling the printer driver to render the facsimile cover sheet and transmitting the created cover sheet data including the number of rendered document pages together with a fax flag indicator to the printer driver, rendering the facsimile cover sheet in accordance with transmitted cover sheet data, spooling the rendered facsimile cover sheet to the memory in accordance with the fax flag indicator, and retrieving the facsimile cover sheet and facsimile document from the memory and outputting both the facsimile cover sheet and facsimile document in proper order, respectively.

8 Claims, 17 Drawing Sheets

Create Individual

Prefix First Last Suffix

Company

Dept./Div.

Fax Numbers

[ Add ]  [ Edit ]  [ Delete ]

115

Notes

116
[ OK ]  [ Cancel ]  [ Help ]

FIG. 13A

Edit Individual

Prefix First: John  Last: Doe  Suffix

Company: Canon Information Systems

Dept./Div.

Fax Numbers

Work            (XXX) XXX-XXXX

[ Add ]  [ Edit ]  [ Delete ]

120

Notes

121
[ OK ]  [ Cancel ]  [ Help ]

FIG. 13B

PRINTER/FACSIMILE DRIVER WITH PAGE COUNT GENERATION

This application is a division of application Ser. No. 08/453,282 filed May 30, 1995, now allowed.

BACKGROUND OF THE INVENTION

1. Field of the Invention

The present invention relates to a printer/facsimile driver which can appropriately order a facsimile cover sheet and the fax document prior to downloading it to a facsimile device. More particularly, the present invention is a printer/facsimile driver which is configured so it can be recalled by a fax DLL to automatically insert at the beginning of a facsimile output, a facsimile cover sheet having the total number of pages of the facsimile document indicated on its face.

2. Description of the Related Art

Conventionally, in order for a document to be printed or to be faxed, a user must have loaded on his/her computer both a printer driver and a facsimile driver in order to create a document to be printed or a document to be faxed, respectively. Today, however, there are multi-task devices, such as a Canon GP55 digital copier, which can perform both printing and faxing jobs. Since both the print and the fax jobs are performed by the same device, it is desirable to simplify the device's design and reduce the amount of memory required in the device by having a single printer/facsimile driver to perform both print jobs and fax jobs.

Accordingly, there is a need for providing a driver which performs both printing and facsimile operations.

SUMMARY OF THE INVENTION

These needs are addressed by the present invention by providing a printer/facsimile driver which provides both printing and facsimile capabilities and which, when providing facsimile capabilities, allows itself to be recalled so as to generate first the body of the facsimile, and second, a facsimile cover sheet.

More particularly, the present invention is a facsimile output system for creating a facsimile document and facsimile cover sheet which includes the number of document sheets to be faxed, a bitmap logo, notes, and a bitmap signature. The facsimile output system includes an input interface for inputting a document to be faxed and for inputting a facsimile transmission request, a memory for storing processing steps and a printer/facsimile driver for a peripheral device, and a processor for invoking the printer/facsimile driver process steps in response to an input facsimile transmission request. The printer/facsimile driver 1) retrieves the input document to be faxed, 2) creates facsimile cover sheet data, 3) calls and instructs a printer driver of the peripheral device to render a facsimile document based on the input document, to spool the rendered facsimile document to a specified memory location, to signify a number of pages in the rendered facsimile document and to return control to the printer/facsimile driver, 4) recalls the printer driver to render the facsimile cover sheet, transmits the created cover sheet document data with the number of pages rendered together with a fax flag indicator to the printer driver, and instructs the printer driver to render a facsimile cover sheet in accordance with the transmitted cover sheet document data, and to spool the rendered facsimile cover sheet to a specified memory location, and 5) retrieves the facsimile document and facsimile cover sheet from the specified memory locations and transmits both the facsimile cover sheet and facsimile document in proper order, respectively.

BRIEF DESCRIPTION OF THE DRAWINGS

FIGS. 13A and 13B are representational views of sub-dialog boxes which are windows displayed to a user in order to create/edit individual address information.

DETAILED DESCRIPTION OF THE PREFERRED EMBODIMENT

Figure 1:
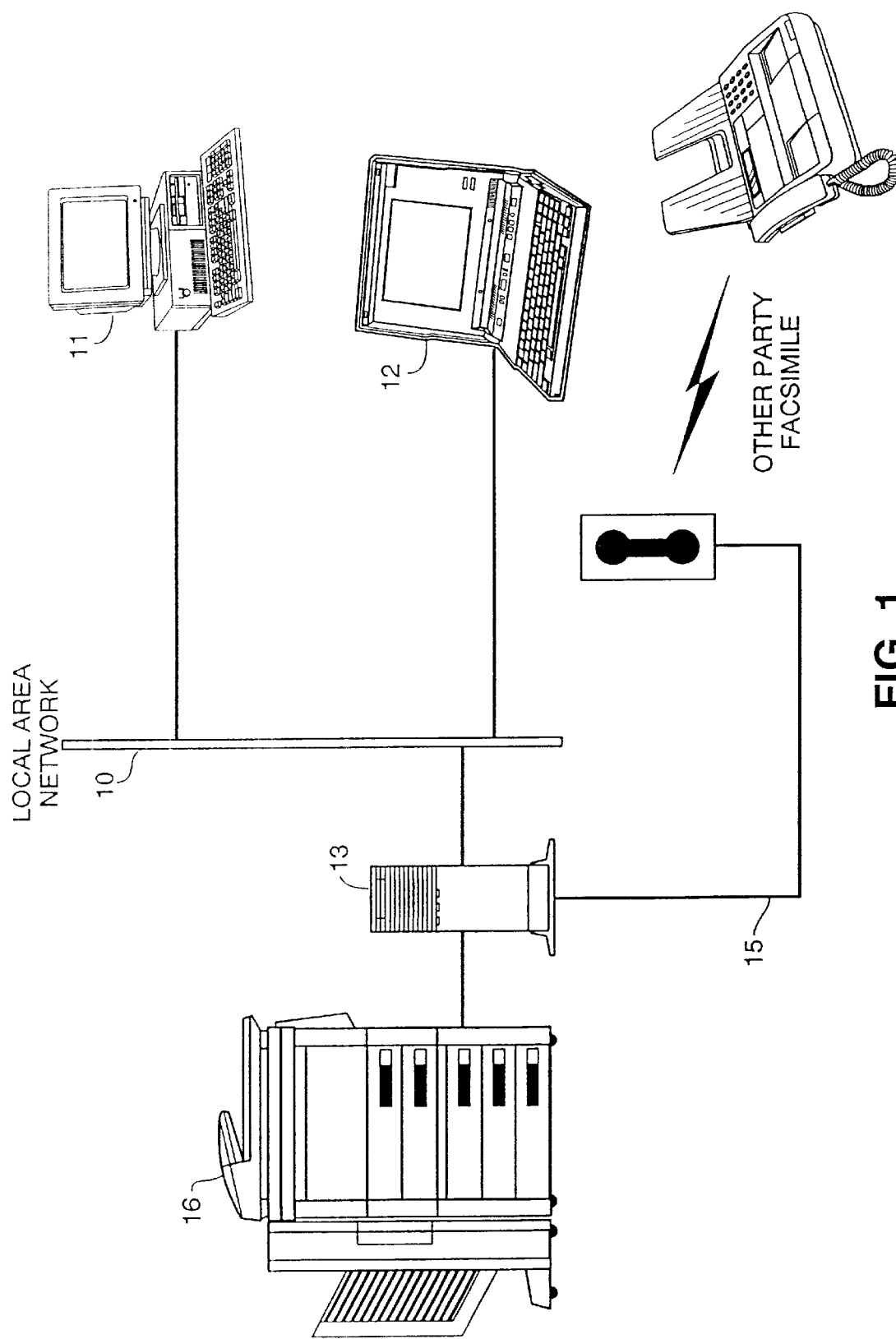
FIG. 1 is an overall system view of a multi-user local area network system which includes a printer/facsimile driver for controlling a digital copier and for transmitting facsimile outputs.

FIG. 1 is an overall view of a typical multi-user local area network in which the present invention operates.

As seen in FIG. 1, local area network 10 is connected to computing equipment 11, laptop computer 12, and multi-device controller 13. Multi-device Controller (hereinafter MDC) 13 is also connected to telephone line 15 and digital copier 16. A suitable digital copier for use in the present invention is a Canon GP55, a digital copier which has the capability of operating as a scanner, printer, and, of course, a copier. MDC 13 accesses an interface bus of digital copier 16 so as to break out the functionality of the scanner section and the printer section. The function and operation of MDC 13 and digital copier 16 will be discussed in greater detail hereinbelow.

The present invention can be embodied in any one of computers 11 or 12. However, for the purpose of simplicity, the present invention will be described with respect to computing equipment 11, which can be a MacIntosh or an IBM PC or PC compatible computer having a windowing environment, such as Microsoft Windows. Provided with computing equipment 11 is a display screen, such as a color monitor or a monochromatic monitor, keyboard for entering text data and user commands, and pointing device such as a mouse for pointing and manipulating objects displayed on the screen.

Computing equipment 11 may include a mass storage device such as a computer disk drive for storing data files which can include document text files and image files, in compressed or uncompressed format, and for storing application program files which can include Windows applications, DOS, Novell Netware®, printer/facsimile driver, and local device drivers. Alternatively, some or all of these applications can be stored on a networked file server (not shown) accessible to computing equipment 11 via local area network 10. In addition, computing equipment 11 can include desktop publishing programs or other information processing programs which contain stored program instructions by which computing equipment 11 manipulates data files and presents data in those files to a user via the display screen or which can be sent across local area network 10.

Figure 2:
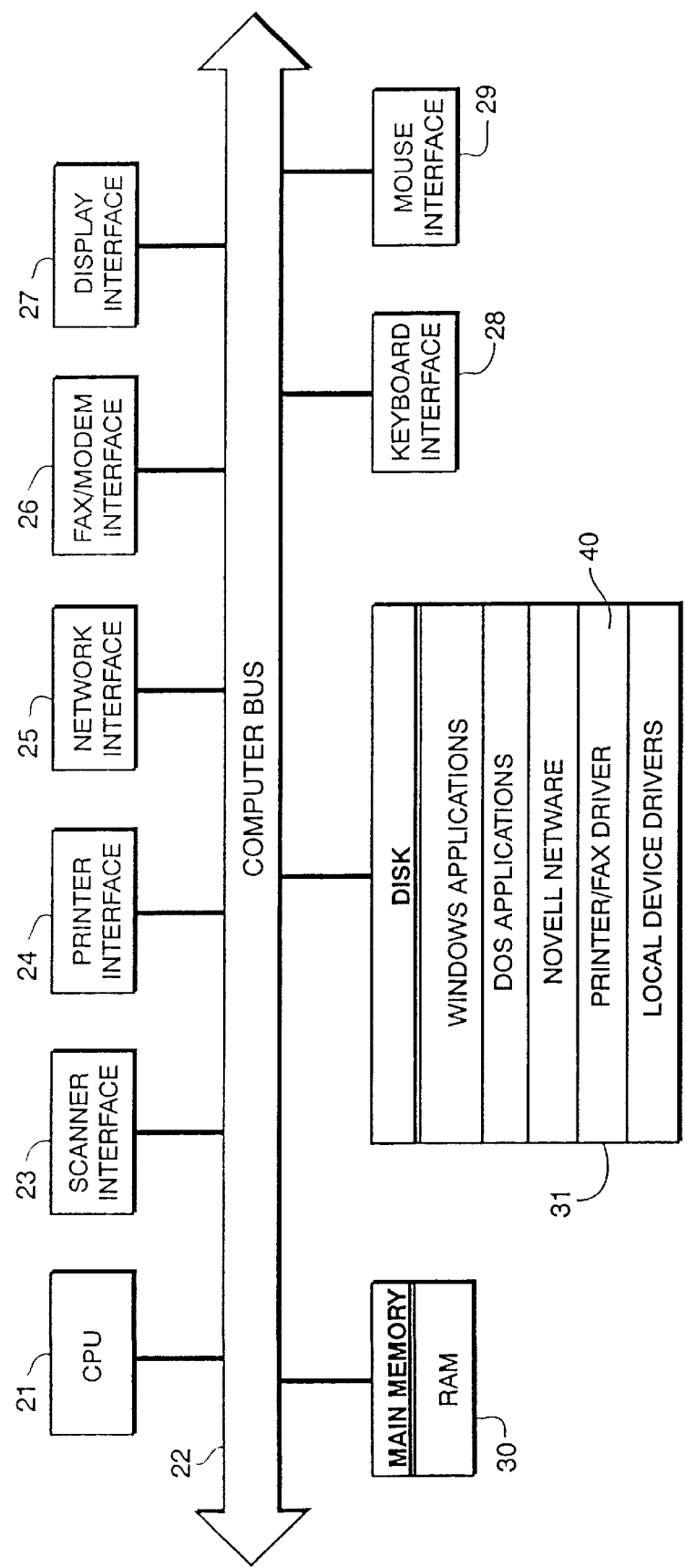
FIG. 2 is a block diagram of the internal structure of the computing equipment used with the present invention.

FIG. 2 is a detailed block diagram showing the internal construction of computing equipment 11. As shown in FIG. 2, computing equipment 11 includes a central processing unit (CPU) 21 interfaced with computer bus 22. Also interfaced with computer bus 22 is local scanner interface 23, local printer interface 24, network interface 25, local facsimile/modem interface 26, display interface 27, keyboard interface 28, mouse interface 29, main memory 30, and disk 31.

Main memory 30 interfaces with computer bus 22 so as to provide random access memory storage for use by CPU 21 when executing stored program instructions such as a Windows desktop publishing program or any one of the local device drivers. More specifically, CPU 21 loads those programs from disk 31 into main memory 30 and executes those stored programs out of main memory 30. In accordance with user instructions, stored application programs are activated which permit processing and manipulating of data. For example, a desktop publishing program such as Wordperfect® for Windows may be activated by a user to create, manipulate, view documents, and print or facsimile documents. Likewise, a device driver may be activated to permit the user to access functionality of the local peripheral devices or the network peripheral devices.

Disk 31 stores Windows applications, DOS applications, network interface software, such as Novell Netware® and local peripheral device drivers. A description of these applications will be omitted since their functionality is well known. Disk 31 also contains printer/facsimile driver 40, which will be explained below in greater detail. Most typically, the applications stored on computer disk 11, including printer/facsimile driver 40, have been stored on disk 31 by downloading the application from a computer readable medium, such as a floppy disk or CD-ROM.

Now, a brief explanation will be provided as to how MDC 13 accesses the functionality of digital copier 16 and sets up the operations of digital copier 16 for use by computing equipment 11 and 12. A more detailed description of MDC 13 and its operation and functionality are provided in U.S. Pat. No. 5,724,555 filed Mar. 23, 1995, which is commonly assigned to the same assignee as the present application.

Figure 3:
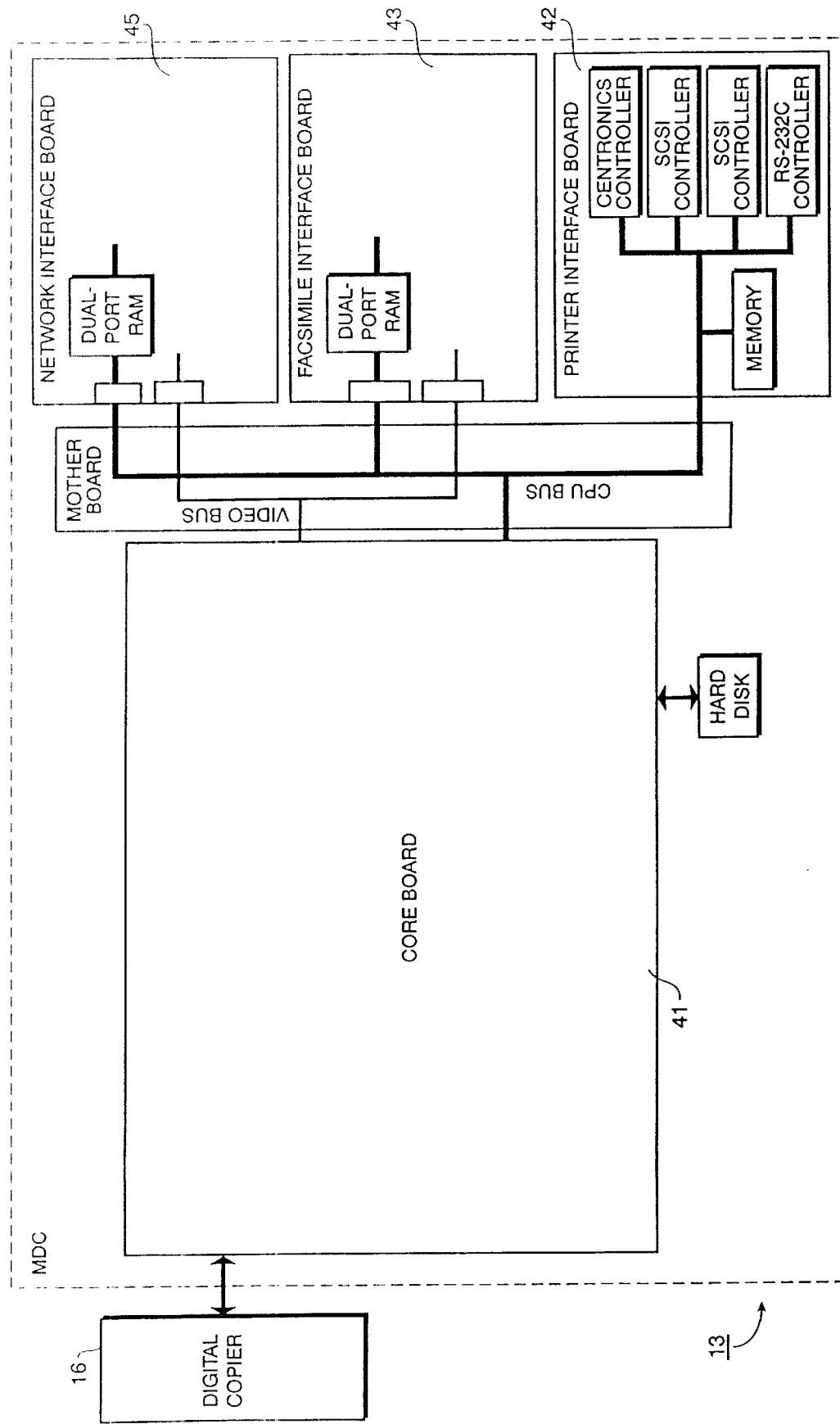
FIG. 3 is a cut-away perspective view of the MDC for showing individual option boards mounted therein.

As shown in FIG. 3, MDC 13 includes core board 41 which accesses the interface bus of digital copier 16 and which provides access to that interface bus by plural option boards which are connectable to core board 41. The option boards communicate with core board 41 via communication through a dual port RAM on each option board. Typically, one of the option boards will include an interface board such as printer interface board 42 which permits connection to digital copier 16. Option boards may also include facsimile board 43 which permits direct output to a telephone line 15 shown in FIG. 1. Another of the option boards, according to the present invention, is network interface board 45 which permits core board 41 and MDC 13 to access local area network 10 shown in FIG. 1.

In operation, digital copier 16 is operable in a stand-alone mode as a standard digital copier. In addition, it as operable as a scanner or as a printer to local users via computing equipment 11 and 12. Most typically, via network interface board 45, and in coordination with MDC 13, digital copier 16 is operable as a multi-functional network device accessible by any of multiple network users who may desire concurrent use of the scanner capability of copier 16, printing capability of copier 16, or one of the option boards in MDC 13, such as the aforementioned facsimile option board 43.

Figure 4:
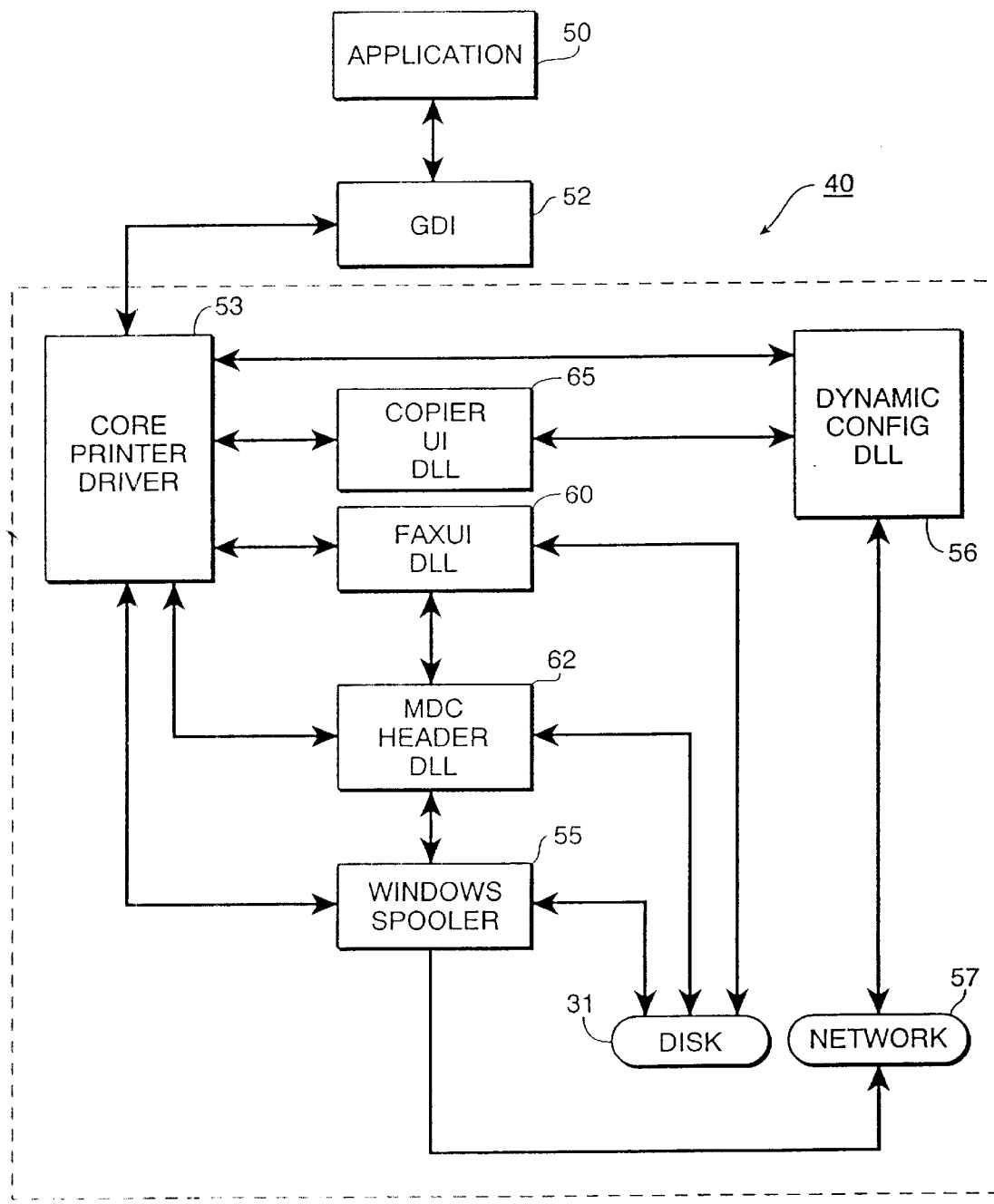
FIG. 4 is a block diagram showing the relationship between software applications and dynamic link libraries and programs contained in the printer/facsimile driver.

FIG. 4 is a block diagram showing the relationship between software applications and dynamic link libraries and programs contained in printer/facsimile driver 40.

As shown in FIG. 4, printer/facsimile driver 40 is used with conventional software application 50, such as Word for Windows or Wordperfect® for Windows which allows a user to prepare, edit and print documents. When a user enters a print document request, application 50 invokes a standard Graphics Device Interface (GDI) 52 which, in turn, invokes core printer driver 53 which operates in accordance with the present invention. If printing is desired, core printer driver 53 simply assembles the print job from application 50 and spools the print job to Windows spooler 55. In a conventional manner, Windows spooler 55 then outputs the print job over the network using conventional means between the Windows operating system and the network software and hardware installed on the network.

On the other hand, where a facsimile output is desired, core printer driver 53 invokes facsimile user interface dynamic link library (fax UIDLL) 60. Generally speaking, fax UIDLL 60 generates the facsimile user interface and pre-fixes a facsimile cover sheet at the beginning of the facsimile job. However, since the facsimile cover sheet needs to include the number of pages being faxed, and since such information is not available until the remainder of the facsimile job is processed, the following steps are taken.

First, fax UIDLL 60 invokes core printer driver 53 in order to create the body of the facsimile document (the facsimile job) by setting a fax flag which indicates to core printer driver 53 that the document is to be spooled to a specific location in disk 31. This time, however, core printer driver 53 does not spool through Windows spooler 55, but rather spools the body of the facsimile document to disk 31. In addition, after the body of the facsimile document has been spooled to disk 31, core printer driver 53 reports to fax UIDLL 60 that it has completed its output and provides fax UIDLL 60 with the number of pages in the facsimile document.

Next, in response to notification from core printer driver 53, that the output has been spooled to disk 31, fax UIDLL 60 again invokes core printer driver 53, but this time with facsimile cover sheet information and another fax flag which indicates to core printer driver 53 to spool the document to disk 31 and to return operation to fax UIDLL 60. In this regard, the manner by which the facsimile cover sheet information is obtained will be discussed in greater detail below. Once again, core printer driver 53 does not spool the facsimile cover sheet to Windows spooler 55, but rather spools it to disk 31.

Fax UIDLL 60 retrieves the cover sheet file and the facsimile body file from disk 31 and spools both, in proper order, and with appropriate headers obtained from MDC header code DLL 62 to Windows spooler 55. Upon obtaining the MDC header information, the facsimile cover sheet and the facsimile document are spooled to network 57 to MDC 13 which routes the facsimile document files to the appropriate destination based on the MDC header information. Typically, the facsimile document will be sent directly over telephone line 15 if MDC 13 includes a facsimile option board.

In either case of printing or faxing, the user must set-up the necessary channel by which the document will be output prior to printing or faxing a document. In the present invention, digital copier 16 or MDC 13 will output a print job or a facsimile job, respectively.

[Generating and Displaying a Graphical User Interface for the Digital Copier]

According to the present invention, printer/facsimile driver 40 includes a software program, copier user interface dynamic link library (copier UIDLL) 65 shown in FIG. 4, which includes process steps to interrogate digital copier 16 for its current configuration, status and capabilities. Copier UIDLL 65 also includes libraries of copier configuration graphical images and commands, copier capabilities graphical images and commands, and libraries of user-selectable job options corresponding to configuration and capabilities of digital copier 16. Based on these libraries, copier UIDLL 65 generates and displays the current configuration and status of digital copier 16 in a graphical user interface display (to be discussed below in greater detail). The graphical user interface display not only contains a graphical representation of digital copier 16 in its current configuration, but also displays the appropriate job options which can be selected based on the current configuration and current capabilities of digital copier 16.

Thus, upon instruction from the user at the user's work station, such as computing equipment 11, copier UIDLL 65 sends a request to dynamic configuration dynamic link library (dynamic config DLL) 56 to interrogate digital copier 16 to obtain a current configuration of digital copier 16 and to obtain information relating to the capabilities of digital copier 16 at that specific time and to return that information to copier UIDLL 65. In this regard, dynamic config DLL 56 returns information or data regarding current configuration and capabilities of digital copier 16, but it is also to be understood that dynamic config DLL 56 could also return instructions to copier UIDLL 65 as to how copier UIDLL 65 should create, build and display the graphical user interface, i.e., vector graphic commands, fill patterns, geometric positional commands, bitmap identifications of bitmaps to be used, etc. When the user needs to access digital copier 16, such as when printing or scanning, copier UIDLL 65 displays to the user a graphical user interface which includes a representative graphical image of digital copier 16 with the graphical image indicating the current configuration at the specific moment the interrogation was answered by digital copier 16.

Figure 5:
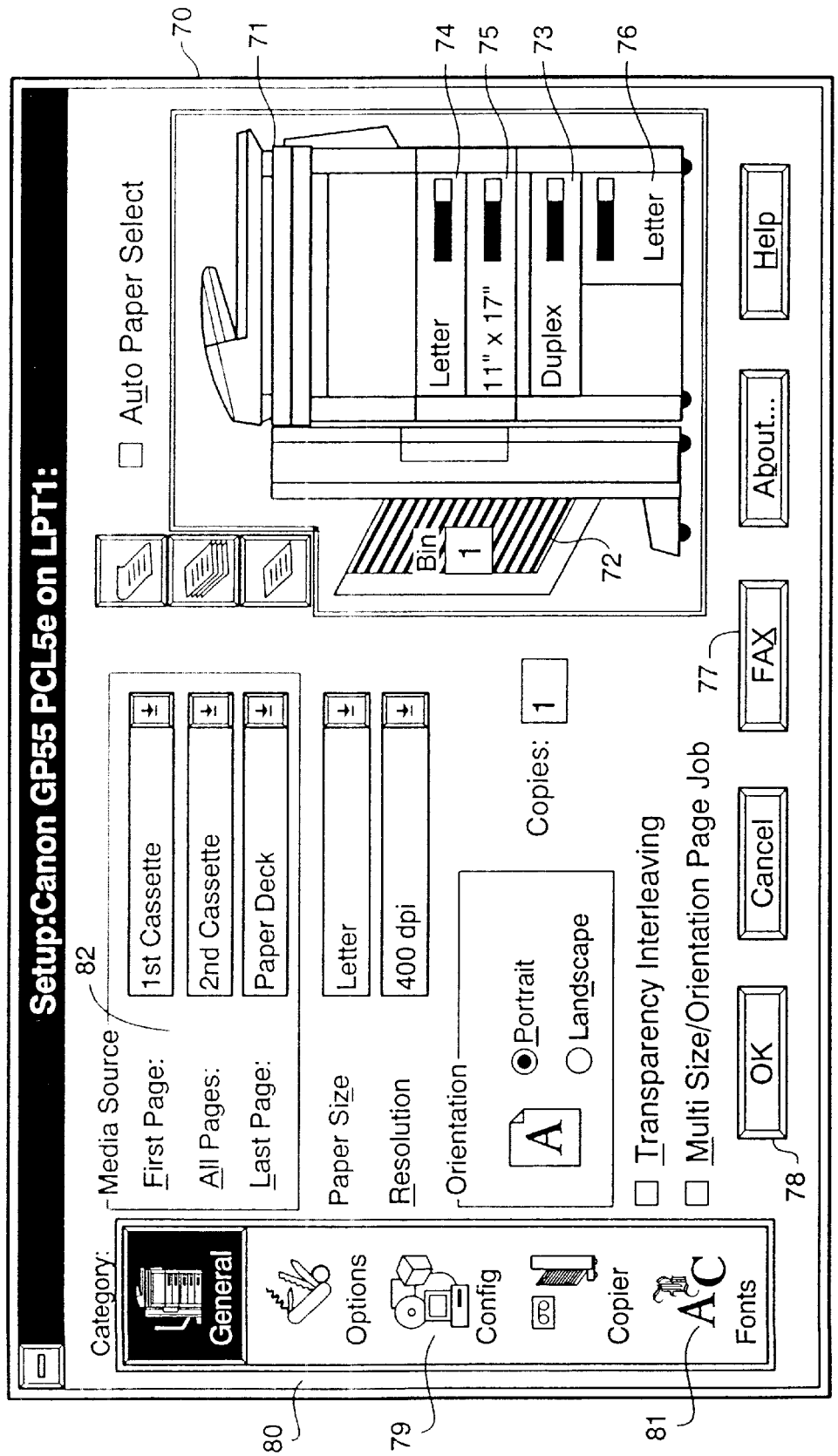
FIG. 5 is a representational view of a graphical user interface display which shows the current configuration and capabilities of the digital copier.

One example of such a graphical user interface of digital copier 16 is shown in FIG. 5 which shows copier-configuration window 70 which includes representative graphical image 71 of digital copier 16. As mentioned above, graphical user interface 70 is generated based on the information returned from digital copier 16 regarding its current capabilities and current configuration. Specifically, copier UIDLL 65 retrieves specific copier configuration libraries and copier capabilities from libraries based on the returned configuration and capabilities information in order to generate a customized graphical user interface such as that shown in FIG. 5. That is, copier UIDLL 65 includes various libraries which include graphical display information and commands for each possible configuration and capabilities of digital copier 16. In this manner, upon receiving information from digital copier 16 regarding its current capabilities and current configuration, copier UIDLL 65 retrieves the configuration and capabilities based on that information and customizes a graphical user interface based on the current configuration and current capabilities of digital copier 16. It is to be understood that only configuration libraries and capabilities libraries which correspond to the returned current configuration and current capabilities of digital copier 16 are retrieved to create an appropriate graphical user interface.

Figure 6A:
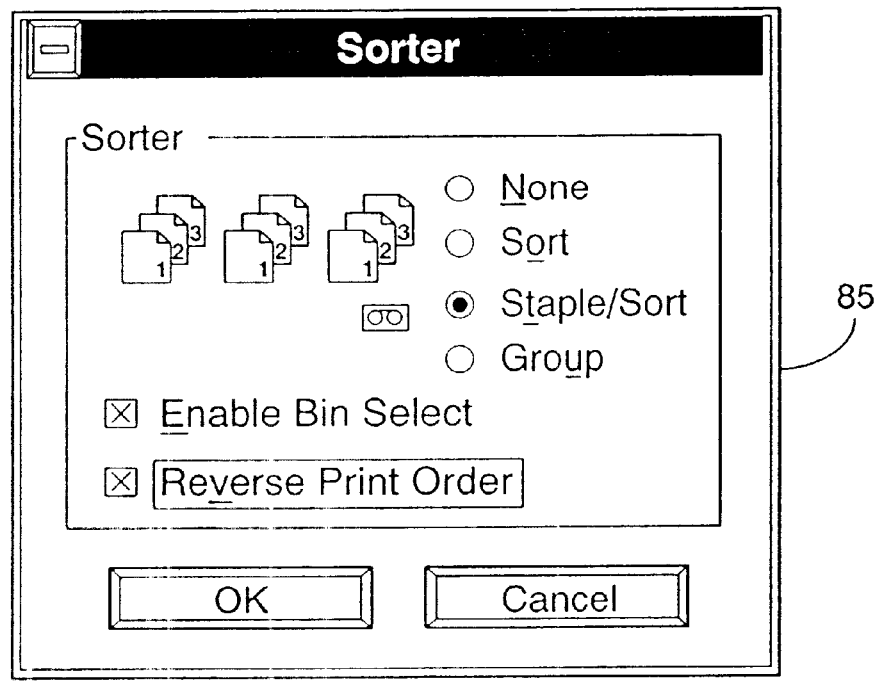
FIGS. 6A–6F are representational views of sub-dialog boxes which are windows displayed to the user in order to select job options for a particular job to be sent to the digital copier.
Figure 6B:
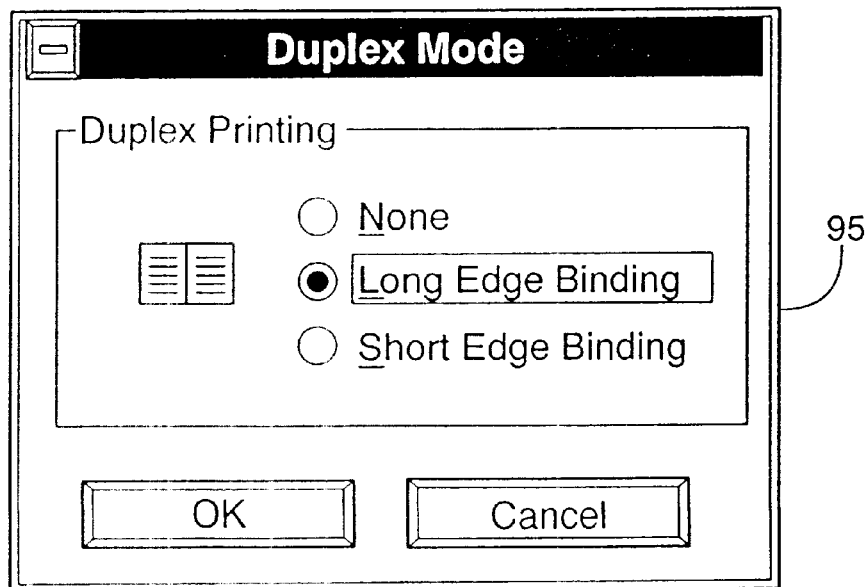

Based on the configuration and the capability libraries retrieved, copier UIDLL 65 also retrieves associated job option menus and dialog boxes to be displayed to a user. As a result, only the job options which are appropriate for the current configuration and the current capabilities of digital copier 16 are provided to the user for selection. For example, copier UIDLL 65 includes sub-dialog boxes which permit the user to select new job options, if desired, by pointing and clicking on job options within the sub-menu or the sub-dialog box provided in copier configuration window 70. For example, FIGS. 6A and 6B illustrate two types of sub-dialog windows. In FIG. 6A, sorter window 85 pops-up when the user clicks on the graphical representation of sorter bin 72. Sorter window 85 permits the user to select how the output document is to be sorted, stapled, grouped, etc. And, in FIG. 6B, duplex window 95 pops-up when the user clicks on the graphical representation of duplex unit 73 and permits the user to select a type of duplex printing.

Other job options displayed in sub-menus or sub-dialog boxes such as those discussed above, are dictated by the list of capabilities and configuration of digital copier 16 during a specific interrogation. Through interaction with the sub-menus or sub-dialog boxes, the user can select new job options for a particular job which is to be sent to digital copier 16. For example, the user can select from many job options such as sorter options, paper tray options, duplexing options, graphics options, print-type options, font-type options, document orientation options, resolution options, transparency interleaving options, and magnification options.

Once the selections have been set, copier UIDLL 65, with the newly selected job options, redisplays graphical image 71 of digital copier 16. Upon reviewing graphical image 71, the user can either again select new job options via the menus or sub-dialog boxes or accept the job options which are displayed by clicking on OK button 78 in copier-configuration window 70.

Depending on the capabilities and options of digital copier 16, the user can select various types of copying operations such as reverse and forward printing, duplexing, color elimination, pattern matching, etc. In addition, the user can select which paper cassette based on type of paper contained within each cassette. And, of course, as noted above, the user has the option of selecting how the print job is to be output whether to a sorter tray or to an individual tray, and whether the output document is to be stapled.

The method of generating and displaying a graphical user interface of digital copier 16 will now be discussed in greater detail with respect to flow diagram 7.

Figure 7:
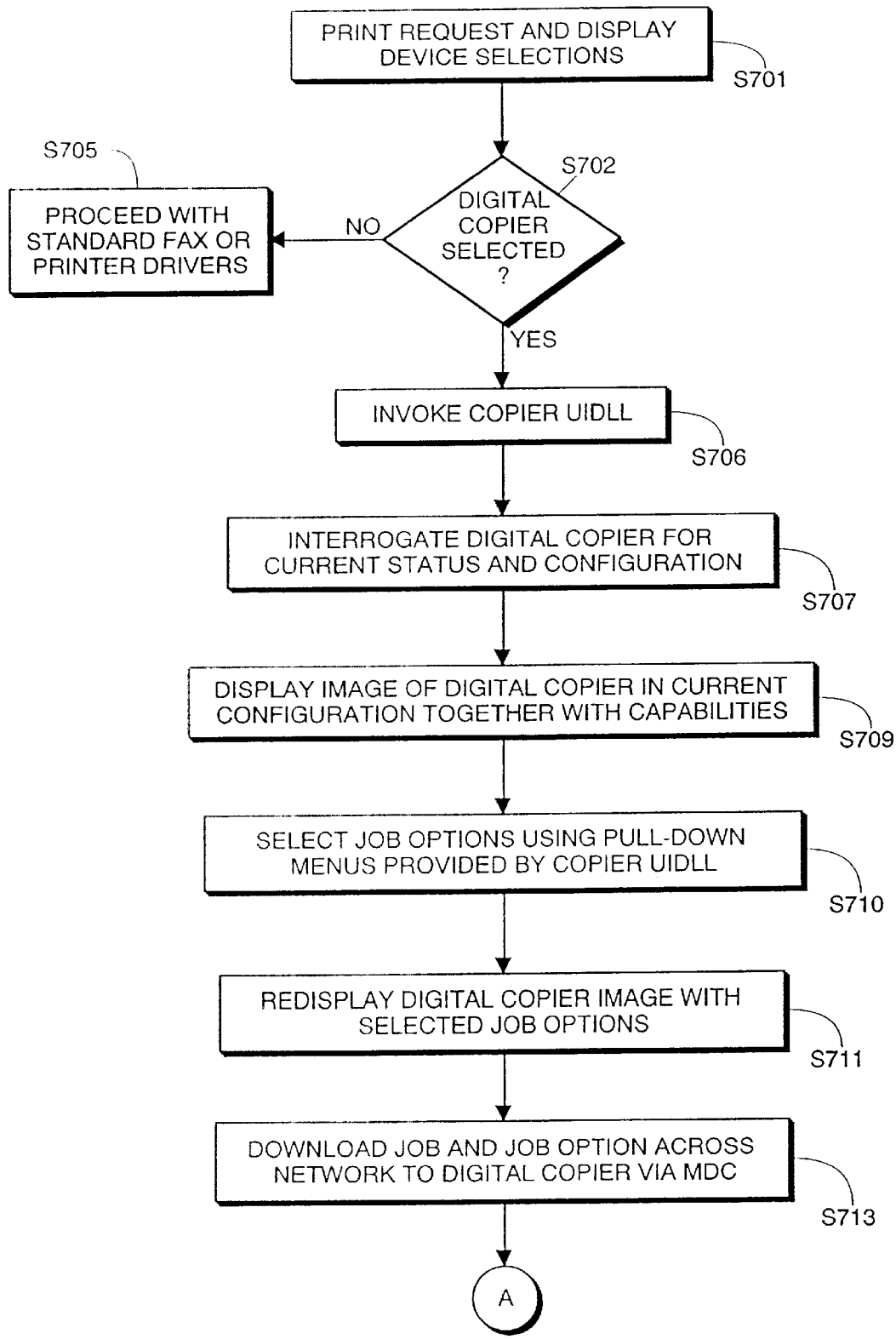
FIG. 7 is a flow diagram describing the method for generating and displaying a graphical user interface which includes a representative graphical image of a current configuration and capabilities of the digital copier.

Referring to FIG. 7, upon completing a document in a word processing application such as Wordperfect or upon retrieving a document to be printed, a print request sent via the currently running word processing application causes device options to be displayed for the print job in step S702. In step S702, it is determined whether networked digital copier 16 is selected. In the case that the digital copier is not selected in step S702, in step S705, GDI 42 invokes an appropriate peripheral device driver, such as the device driver for the local scanner or local facsimile machine based on the user's selection. However, if, in step S702, the network digital copier 16 is selected, flow proceeds to step S706 at which point GDI 42 invokes copier UIDLL 65.

Upon invoking copier UIDLL 65, the status of the configuration of digital copier 16 is immediately requested by sending a configuration and capabilities interrogation via dynamic config DLL 56 over LAN 10 to digital copier 16 (step S707). Upon a return of the requested configuration and capabilities information from digital copier 16, copier UIDLL 65 generates a graphical user interface which reflects the current configuration and the current capabilities of digital copier 16 at the specific instance the interrogation was received by digital copier 16.

In step S709, if digital copier setup is requested, digital copier graphical image 71 which represents digital copier 16 as it is currently configured and with its current capabilities is displayed to the user. In addition, copier UIDLL 65 generates and displays only job option menus and job-option dialog boxes which are applicable to that current configuration and capabilities of digital copier 16. For example, as shown in FIG. 5, digital copier 16 is shown as having 20-bin staple sorter 72, two cassettes 74 and 75, paper deck 76, and duplex unit 73. By using the mouse to point and click on graphical image 71, current copier-configuration window 70 becomes an interactive graphical user interface which responds to user selections when the user clicks on any portion of the digital copier in graphical image 71. For example, if the user points and clicks on sorter tray 72, the sub-dialog box 85 shown in FIG. 6A will appear overlaid onto copier-configuration window 70. Utilizing the sub-dialog box 85 for the sorter, the user can alter or reconfigure how the documents are to be sorted upon being printed. Similarly, sub-dialog box 95 shown in FIG. 6B will appear if the user points and clicks anywhere on duplex unit 73 of digital copier 16 shown in window 700.

As mentioned previously, if digital copier 16 does not include, for example, a sorter, the sorter will not be displayed. Likewise, job option sub-dialog boxes for the sorter will not be displayed. Thus, only job options which can be carried out by digital copier 16 based on its current configuration and current capabilities will be provided to the user. In this manner, the user cannot try to select a job option which is not available or cannot physically be performed based on the current capabilities of digital copier 16.

In-step S710, it is determined whether the user has pointed and clicked on any of the sub-dialog boxes or option menus. By pointing and clicking on any number of new job options, the user can select job options for digital copier 16 to perform. For example, if the user clicks on "configuration" icon 79, the dialog box shown in FIG. 6C is overlaid over window 70.

Figure 6C:
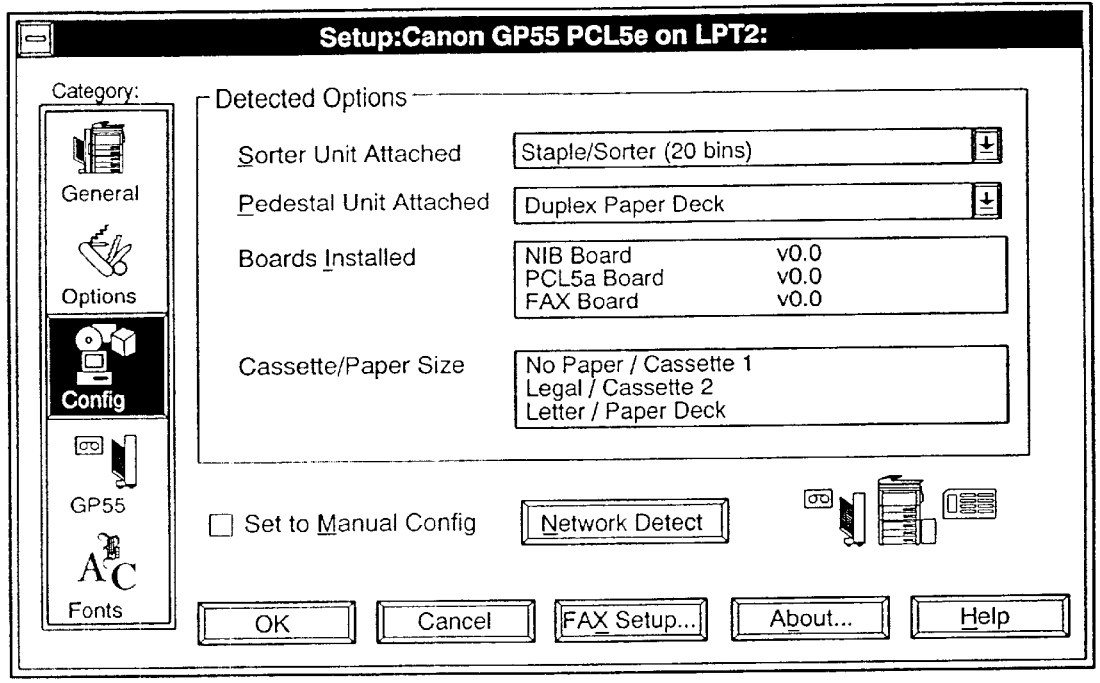
Figure 6D:
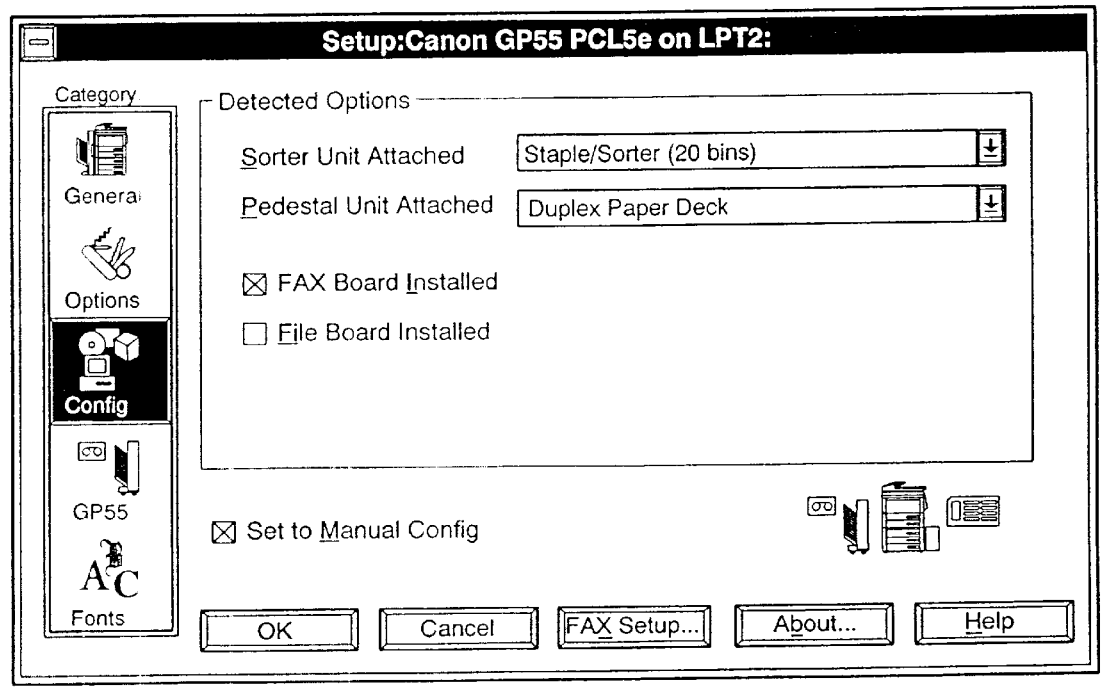

FIG. 6C displays to the user the correct set-up of digital copier 16 and the options available to a network user. If communication could not be established with digital copier 16, the selections in the displayed dialog boxes will change to allow the user to manually enter the options in FIG. 6D. The "set to manual configuration" button will allow permanent disabling of any network detection. Nevertheless, using the various sub-dialog boxes shown there, the user can review configuration settings and capabilities of digital copier 16 in FIG. 6C.

Figure 6E:
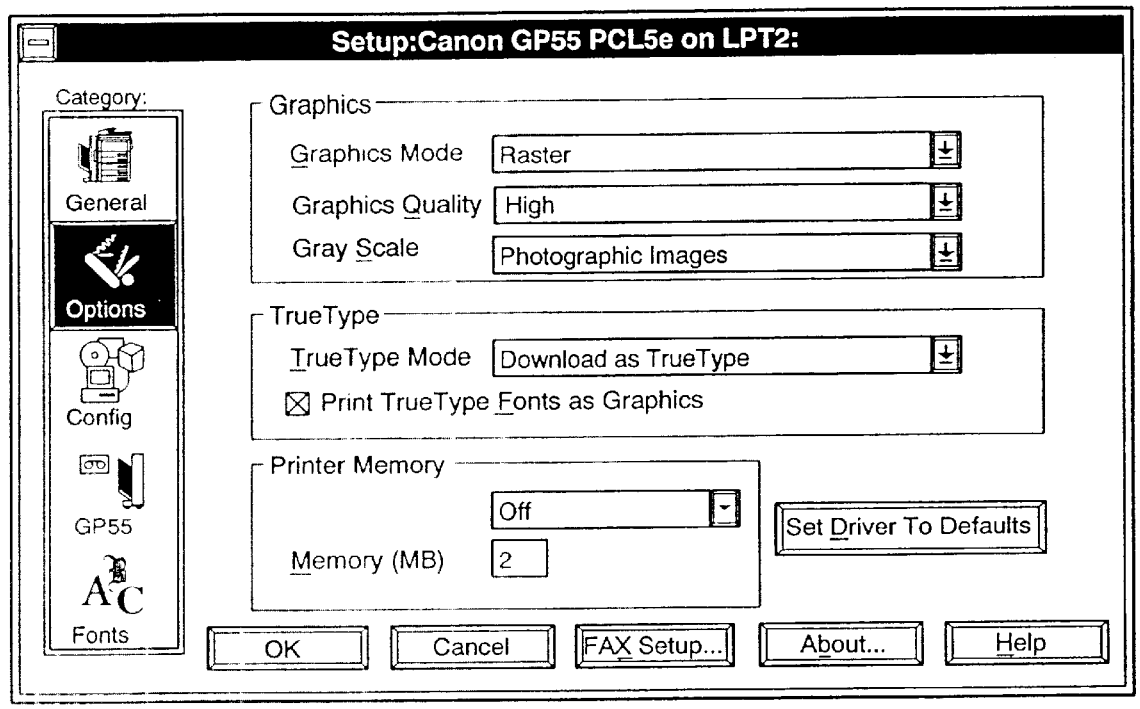
Figure 6F:
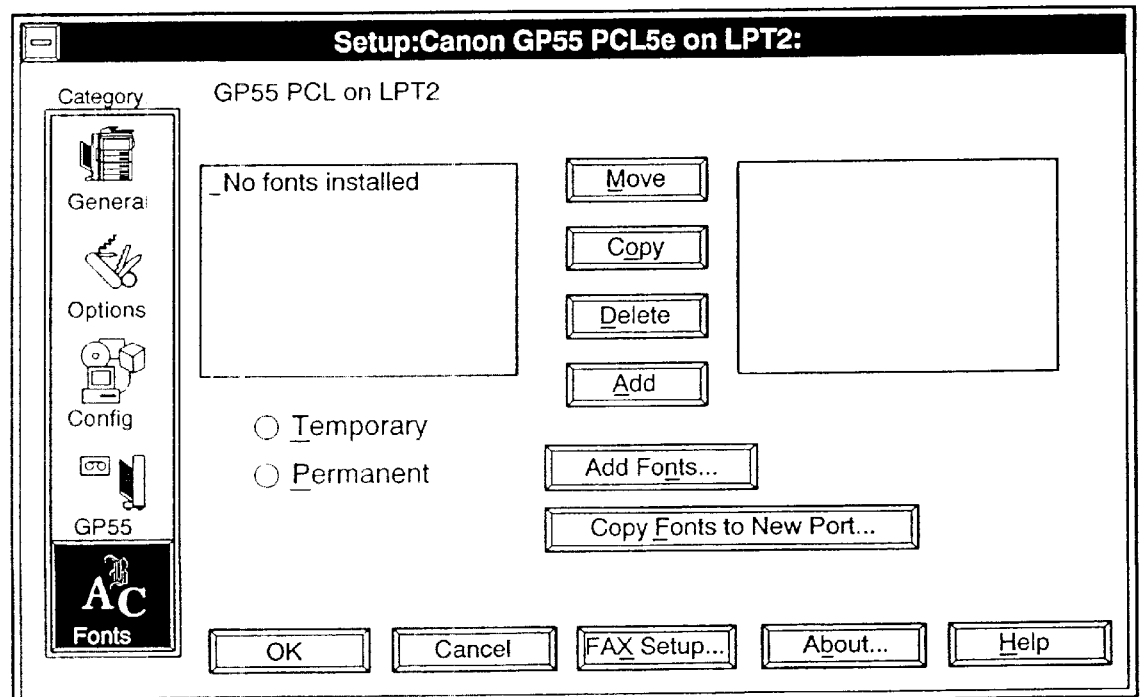

If the user wishes to change printing options of digital copies 16, the user clicks on "option" icon 80. Upon clicking on option icon 80, the dialog box shown in FIG. 6E is overlaid over window 70. By resetting job options in various sub-dialog boxes provided therein, the user can change a graphics mode, graphics quality, gray scale, font and printer memory capacity.

Once the user has set various job options for a specific job, copier UIDLL 65 redisplays copier-configuration window 70 which shows the selected job options in step S711. In this manner, in step S711, the user can determine if the newly selected job options are acceptable for the user's particular task. If the job options are not acceptable, the user can select new job options for digital copier 16.

If the new job options are not to be selected, flow proceeds to step S713 at which point all job option data are sent across the network to digital copier 16 via MDC 13. In this regard, all job option settings which are the same as the settings of the current job options are downloaded even though no changes to the settings were made. Likewise, if the user has reset all job options of digital copier 16, all job option data, including newly selected job option settings as well as job option settings which were not changed, are downloaded with the print job across the network to digital copier 16 via MDC 13 in step S716 as well.

Preferably, job option settings are selected at the time a print job is requested and, in this manner, the job option data is output to the printer queue as a header file of the print file when it is downloaded to digital copier 16. It is noted that it is possible to set job option selections for digital copier 16 at any time and not necessarily at the time a print job is requested.

On the other hand, if the document to be output is not to be printed to digital copier 16, but rather transmitted as a facsimile output, the user clicks on facsimile button 77 in window 70. This action prompts the set-up of the facsimile document body and cover sheet by fax UIDLL 60 which in turn outputs both files to MDC 13 for output. This operation and the printing operation will be discussed in greater detail below.

[Printing/Faxing]

Figure 8A:
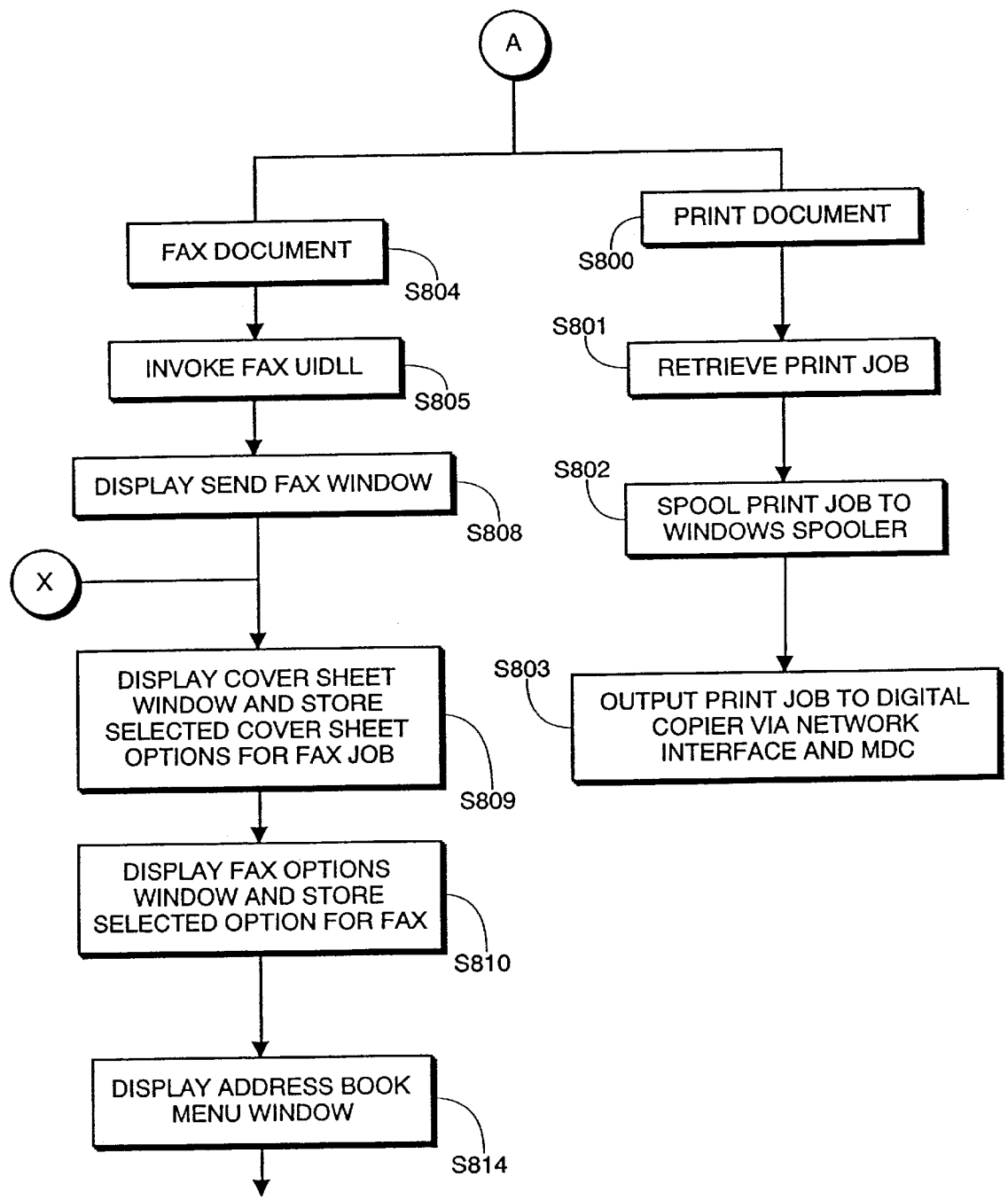
FIGS. 8A and 8B are flow diagrams describing how to print a document to the digital copier or how to prepare a facsimile cover sheet and facsimile document prior to transmission.
Figure 8B:
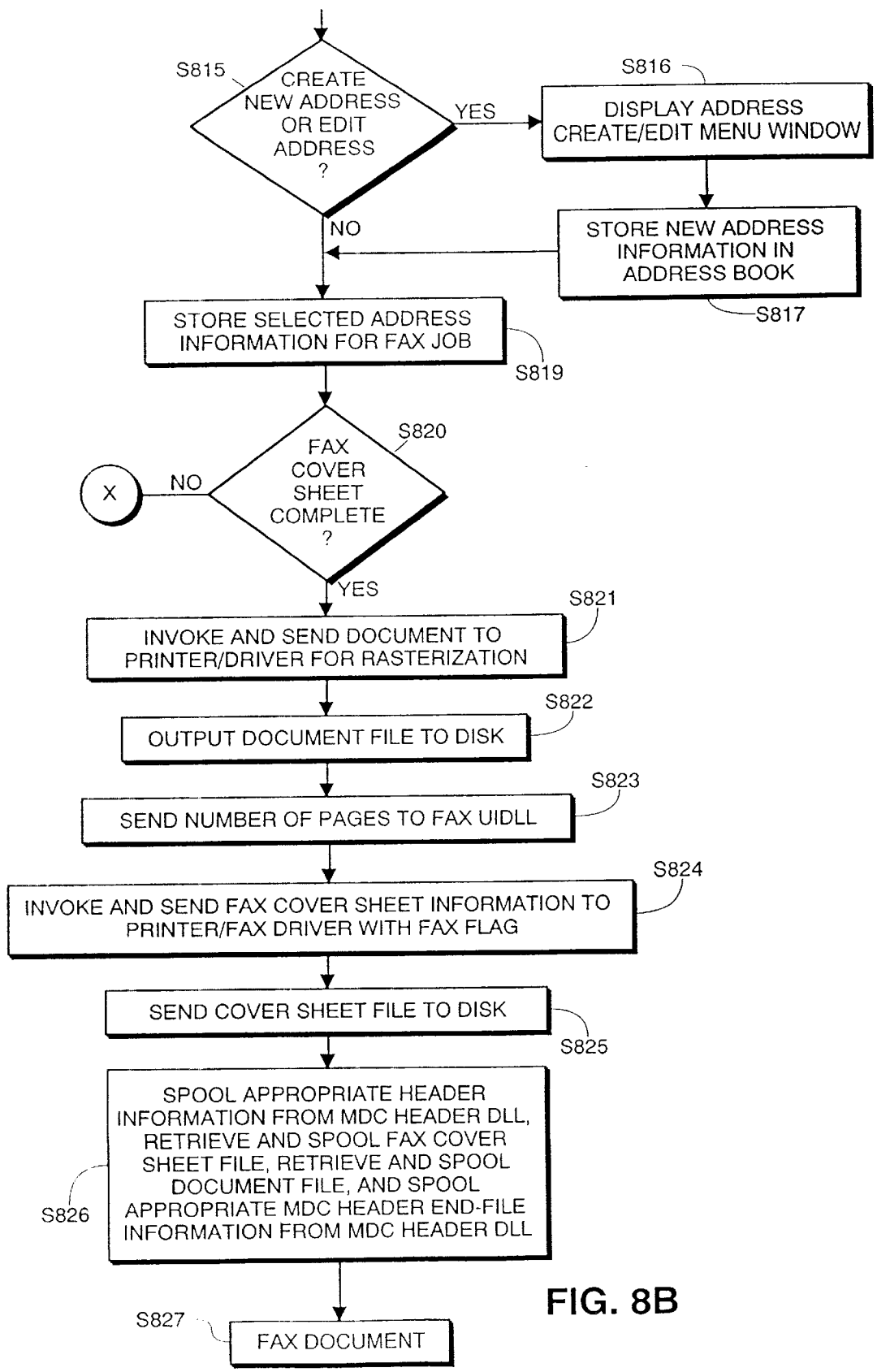
Figure 9:
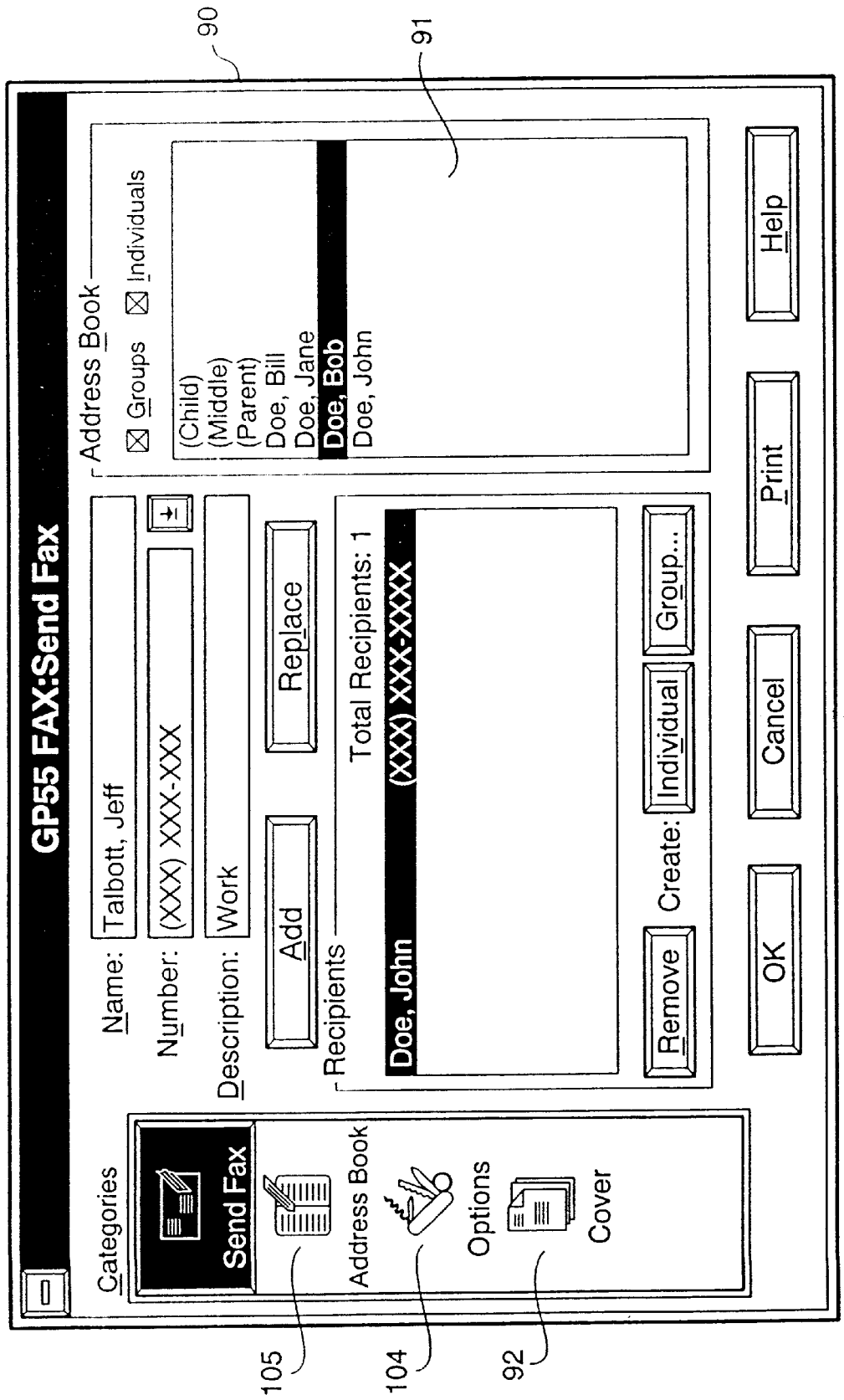
FIG. 9 is a representational view of a graphical user interface display which is displayed to a user for sending a facsimile transmission.

FIGS. 8A and 8B illustrate the method by which a document prepared at computing equipment 11 can be output, via local area network 10, to either a printed document or a facsimile transmission. The process steps shown in FIGS. 8A and 8B are executed by CPU 21 by loading various software programs of printer/facsimile driver 40 into main memory 30 and executing process steps in those programs from main memory 30.

The process steps in FIGS. 8A and 8B illustrate operation of CPU 21, which retrieves programs from disk 31, executes those programs, then in turn invokes various user interface dynamic link libraries which operate to send data and receive data across local area network 10. In addition, the process steps provide for access to digital copier 16, via MDC 13 which also directs data files from computing equipment 11 to the appropriate destination such as a facsimile job which is sent out over telephone line 15.

If the document is to be printed (step S800), GDI 52 invokes core printer driver 53 which operates to retrieve the print job from the currently operating word processing application in step S801. After retrieving the print job, core printer driver 53 spools the print job to Windows spooler 55 in step S802. In a known manner, Windows spooler 55 outputs the print job to digital copier 16 via the network interface and MDC 13 which directs the print file to digital copier 16 for printing in step S803.

On the other hand, if the document is to be a facsimile output (step S804), core printer driver 53 invokes fax UIDLL 60 in step S805. In step S808, fax UIDLL 60 displays send-fax window 90 which provides the user by way of option menus and sub-dialog boxes the following options: addressing of an outgoing facsimile, editing the address book, creating/editing the cover sheet layout, and setting the facsimile options. For example, by pointing and clicking on a name in "address book" 91, a fax recipient name is highlighted. By "double" clicking on the same name, the name and corresponding fax number will be automatically entered into the "recipient" field of the cover sheet in send-fax dialog box 90. On the other hand, if an individual name does not appear in address book 91, the user can manually enter the recipients name and fax number in "Name" field and "Number" field.

Figure 10:
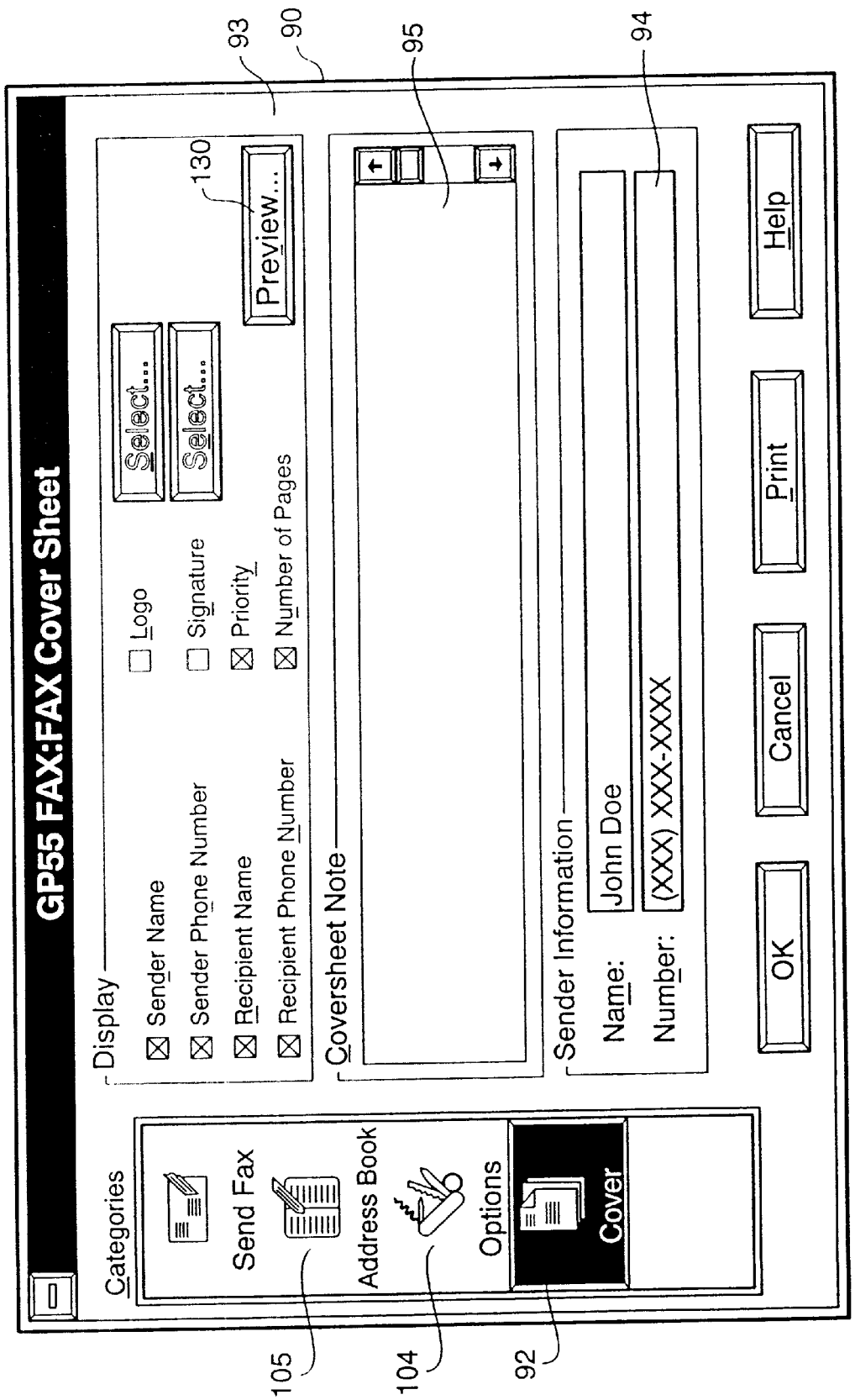
FIG. 10 is a representational view of a graphical user interface display which is displayed to a user in order to create/edit a facsimile cover sheet.

Most typically, the user will define the data to be inserted into a cover sheet prior to sending a facsimile transmission. Thus, in step S809, by clicking on "cover sheet" icon 92 in send-fax window 90, a sub-dialog box entitled "fax-coversheet" appears as shown in FIG. 10. Fax cover-sheet dialog box 93 includes alterable settings to edit a cover sheet layout for the facsimile as well as to preview the cover sheet upon its completion.

As described above, upon clicking on cover sheet icon 92, fax-cover-sheet sub-dialog box 93 pops-up. As discussed above, fax-cover-sheet sub-dialog box 93 shown in FIG. 10 allows the user to create and edit a cover sheet. The cover sheet which can be created by using the options shown in facsimile-cover-sheet dialog box 93 permits the user to enter the following information: sender's name, sender's facsimile number, recipient('s) name(s), recipient('s) phone number(s), page count, priority, logo, and signature. The user can enter all this information by pointing and clicking on the appropriate function in fax-cover-sheet sub-dialog box 93 shown in FIG. 10. For example, by clicking on "sender-information" box 94, the user can enter a new sender "Name" and "Number", or modify the existing sender Name and Number. In sub-dialog box 95, the user can enter a cover sheet note to be printed on the front of the cover sheet.

Figure 11:
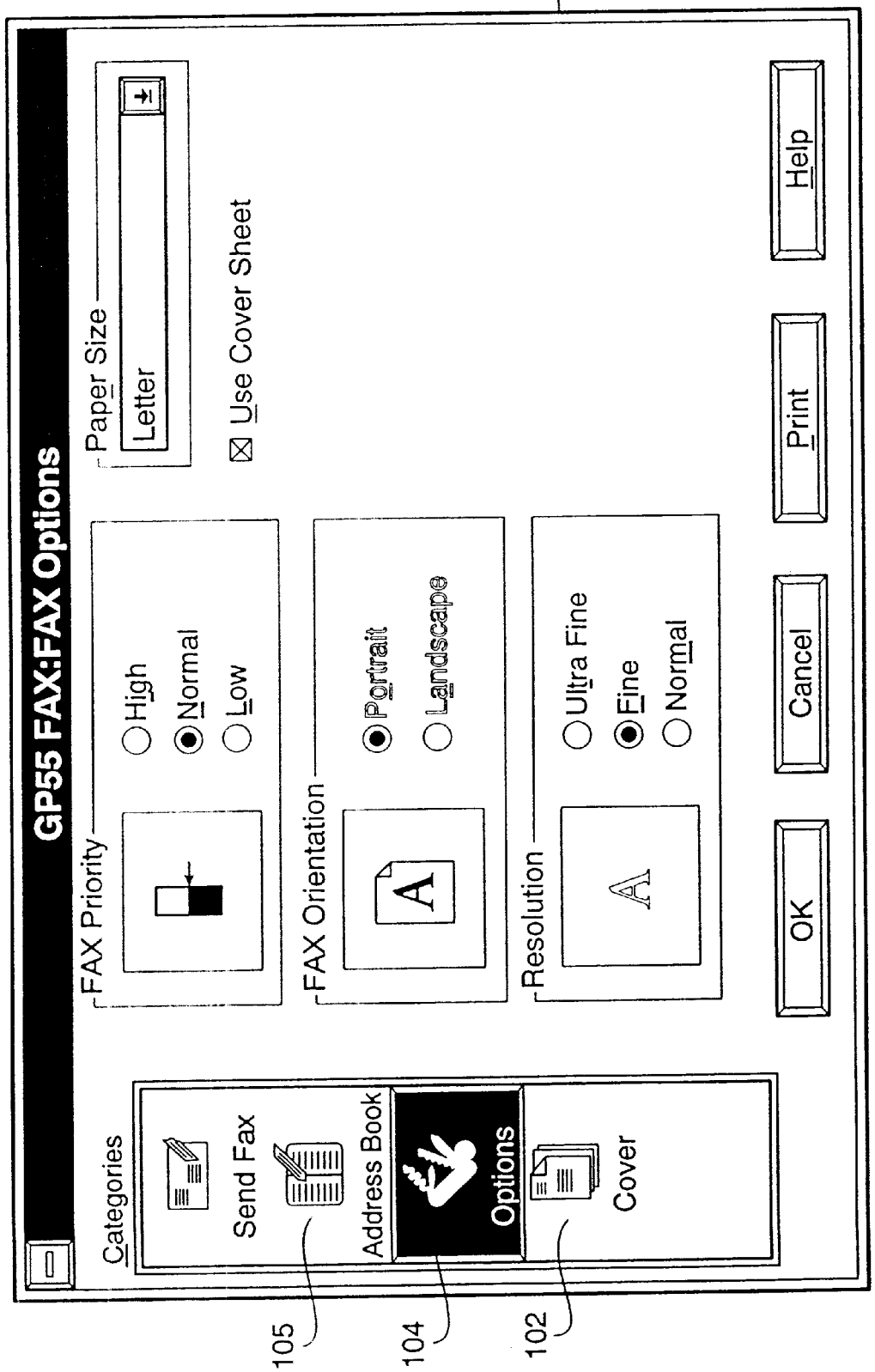
FIG. 11 is a representational view of a graphical user interface display for designating facsimile options.

Upon completing the cover sheet, the user can set the facsimile options. Thus, by clicking on "options" icon 104 in step S810, fax UIDLL 50 displays fax-options sub-dialog box 100 shown in FIG. 11 to the user. As shown in FIG. 11, fax-options sub-dialog box 100 allows the user to select the priority of the facsimile output, the orientation of the facsimile document, i.e., portrait or landscape, a resolution, and appropriate paper size for the document.

Figure 12:
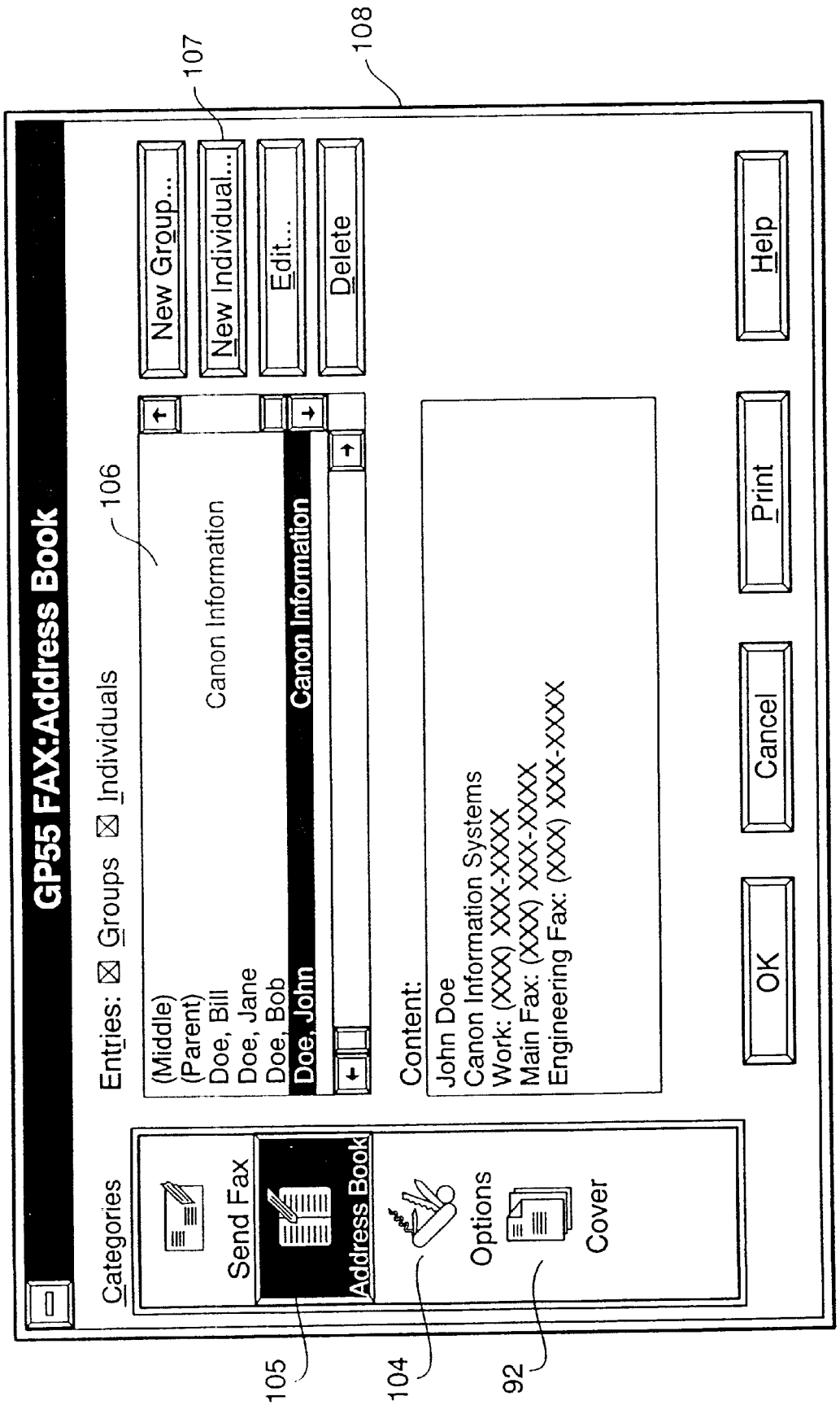
FIG. 12 is a representational view of a graphical user interface display of an address book which is displayed to a user in order to create and edit address book entries.

If the user points and clicks on "addressbook" icon 105, address-book sub-dialog box 106 pops-up as shown in FIG. 12 (step S814). Address-book sub-dialog box 106 allows a user to create/edit entries in the address book by inputting names, addresses, and facsimile information into the address book. To create or edit an entry, the user clicks either a "new-individual" button 107 or "edit" button 108, respectively. That is, in steps S815 and S816, in the case that a recipient's name and fax number are not in the address book or the recipient information has changed, the user can enter the individual's name and telephone number by clicking on new-individual button 107 or edit button 108 in address-book sub-dialog box 106.

Upon clicking on new-individual button 107 in address-book sub-dialog box 106, "create-individual" sub-dialog box shown in FIG. 13A will appear. Create-individual sub-dialog box 115 permits the user to enter the individual's name, company, facsimile numbers, and a brief note. The entry will be added to the address book listing shown in create-individual sub-dialog box 115 upon clicking on "OK" button 116 in create-individual sub-dialog box 115. In addition, a user can change information of an entry in the address book by clicking on "edit" button 108 which causes "edit-individual" sub-dialog box 120 to pop-up. In sub-dialog box 120, an entry which is highlighted in address-book sub-dialog box 106 is reproduced in the "edit-individual" sub-dialog box 120 at which point the user can edit any of the individual's personal information and then add the changes back into the address book by clicking on "OK" button 121.

Address-book sub-dialog box 106 also permits the user to create/edit entries of a group much in the same manner as an individual's entry as described above.

Figure 14A:
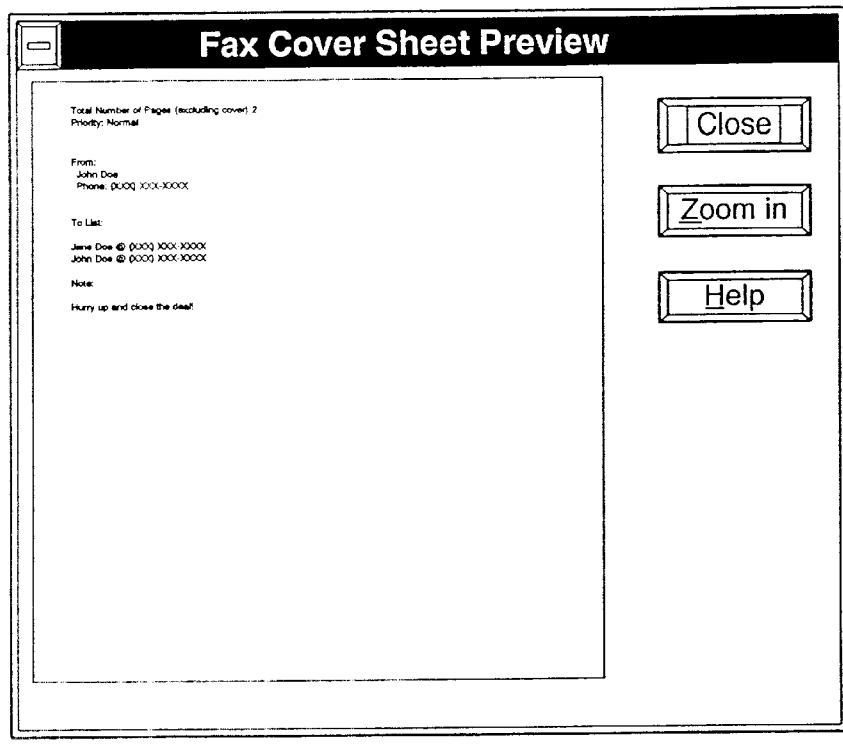
FIGS. 14A and 14B are representational views of sub-dialog boxes which are windows displayed to a user for the purpose of previewing a facsimile cover sheet prior to transmission.
Figure 14B:
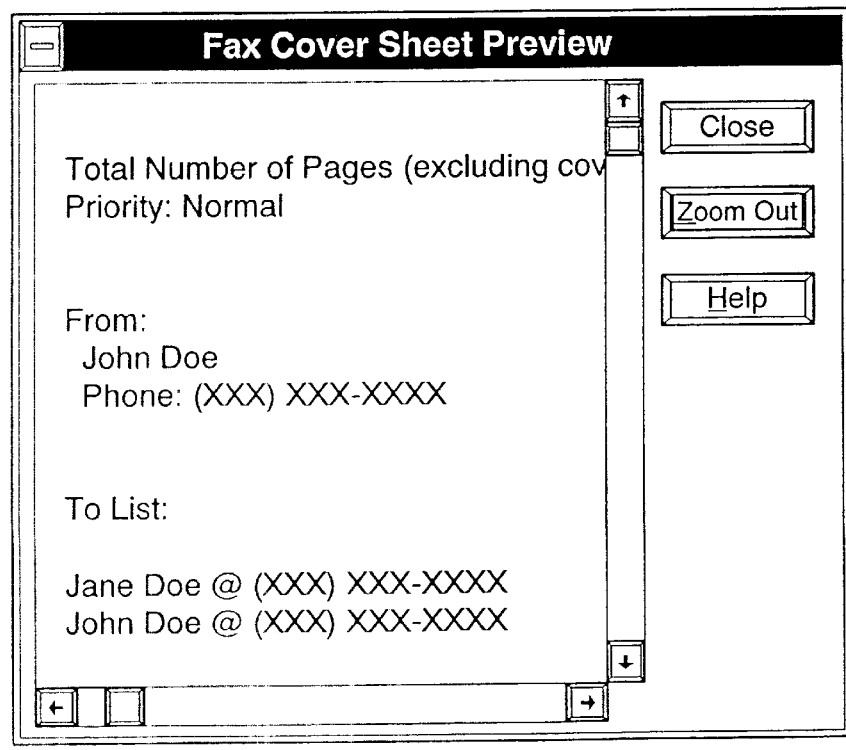

Upon completing steps S815–S819, the user can return to fax-cover-sheet sub-dialog box 93 at which point the user can click on "preview" button 130 to preview the facsimile cover sheet. As shown in FIGS. 14A and 14B, the user can preview the facsimile cover sheet in "facsimile-cover-sheetpreview" window 140. As shown in FIG. 14B, the user has the option to preview the cover sheet by zooming in and zooming out in order to preview specific portions of the cover sheet. If the facsimile cover sheet is not completed, the user simply re-enters the necessary information in same manner as described above by returning flow to step S809.

On the other hand, if no entries are being created or edited, upon completing the cover sheet and clicking on the OK button, flow proceeds to step S821 at which point fax UIDLL 60 has gathered all of the information for the cover sheet and calls core printer driver 53. Thus, in step S821, fax UIDLL 60 invokes core printer driver 53 and sets a facsimile flag so that core printer driver 53 knows that the document which is to be retrieved from the currently operating word processing application is to be a facsimile output. Fax UIDLL controls core printer 53 to retrieve and rasterize the document prepared by the word processing apparatus.

In step S822, core printer driver 53 rasterizes the document and outputs the rasterized document file to a specific memory location in disk 31 which has been designated by the fax flag. In step S823, core printer driver 53 calls fax UIDLL 60 to inform it that it has completed the rendering of the document to disk 31 and, most importantly, provides fax UIDLL 60 with the number of rendered pages of the document. In step S823, core printer driver 53 releases control back to fax UIDLL 60, at which point fax UIDLL 60 compiles the data necessary for forming the cover sheet.

In step S824, fax UIDLL 60 recalls core printer driver 53 with the facsimile cover sheet information. At this time, fax UIDLL 60 also sends a fax flag to core printer driver 53 so that the information is not sent to Window spooler 55, but rather the cover sheet file is sent to a specified memory location in disk 31. That is, core printer driver 53 acknowledges the facsimile flag sent from fax UIDLL 60 so it does not try to call fax UIDLL 60 again as it would upon receiving a request to send a facsimile transmission, but rather spools the facsimile cover sheet to disk 31 in step S825.

In step S826, fax UIDLL 60 controls MDC header DLL 52 to spool an appropriate MDC header to Windows spooler 55. After the MDC header information has been spooled, fax UIDLL 60 retrieves the facsimile cover sheet file and the facsimile body file from disk 31 and spools both in proper order to Window spooler 55. To complete the facsimile output, fax UIDLL 60 again controls MDC header DLL 52 to spool MDC header end-of-file information to Windows spooler 55.

Finally, in step S827, windows spooler 55 upon receiving all of the facsimile output information transmits the facsimile output across the local area network 10 to MDC 13 which routes the output based on the MDC header information to its appropriate destination.

The invention has been described with respect to a particular illustrated embodiment. It is to be understood that the invention is not limited to the above-described embodiment and that various changes and modifications may be made by those of ordinary skill in the art without departing from the spirit and scope of the invention.

What is claimed is:

1. A method for processing rendering requests for print jobs and facsimile jobs, comprising:

receiving data and an indication that the data is one of a print job and a facsimile job;

rendering the data and spooling the rendered data to an operating system spooler, if the indication is that the data is a print job; and rendering the data into at least one page of rendered data, spooling the rendered data to an area in memory, determining a page count corresponding to the at least one page of rendered data, and returning a count representing a total number of rendered pages of the facsimile lob, if the indication is that the data is a facsimile job.

2. A method according to claim 1, wherein, in said receiving step, data are received from a word processing application.

3. A method according to claim 1, further comprising a step of outputting the rendered data to a peripheral device and causing the peripheral device to perform the print job or the facsimile job of the rendered data.

4. A method according to claim 1, wherein if the indication is that the data is the facsimile job, image data corresponding to the returned count representing a total number of rendered pages of the facsimile job are further rendered to the area in the memory.

5. A computer executable program stored on a computer readable storage medium, comprising:

a step to cause reception of data and an indication that the data is one of a print job and a facsimile job;

a step to cause the data to be rendered and to cause the rendered data to be spooled to a spooler for printing, if the indication is that the data is a print job; and a step to cause the data to be rendered into at least one page of rendered data, to cause the rendered data to be spooled to an area in memory, to determine a page count corresponding to the at least one page of rendered data, and to cause a count representing a total number of rendered pages of the facsimile job to be returned, if the indication is that the data is a facsimile job.

6. The program according to claim 5, wherein the data are received from a word processing application.

7. The program according to claim 5, further comprising a step to cause the rendered data to be output a peripheral device and to cause the peripheral device to perform the print job and the facsimile job of the rendered data.

8. The program according to claim 5, wherein if the indication is that the data is the facsimile job, image data corresponding to the returned count representing a total number of rendered pages of the facsimile job are further rendered to the area in the memory.

* * * * *

UNITED STATES PATENT AND TRADEMARK OFFICE
CERTIFICATE OF CORRECTION

PATENT NO. : 6,118,546

DATED : September 12, 2000

INVENTORS : GEORGE A. SANCHEZ

It is certified that error appears in the above-identified patent and that said Letters Patent is hereby corrected as shown below:

COLUMN 7

Line 49, "window 700." should read --window 70.--.

COLUMN 9

Line 22, "recipients" should read --recipient's--.

COLUMN 10

Line 28, "sheetpreview"" should read --sheet-preview"--.

COLUMN 11

Line 32, "lob," should read --job,-.

COLUMN 12

Line 27, "output" should read --output to--.

Signed and Sealed this

Fifteenth Day of May, 2001

Attest:

NICHOLAS P. GODICI

Attesting Officer    Acting Director of the United States Patent and Trademark Office